United States Patent Office 3,574,205
Patented Apr. 6, 1971

3,574,205
3-AMINO-2-(AMINOMETHYL)PRO-
PIONAPHTHONES
Malcolm W. Moon, Kalamazoo, Mich., assignor to The
Upjohn Company, Kalamazoo, Mich.
No Drawing. Filed July 5, 1967, Ser. No. 651,121
Int. Cl. C07d 87/34
U.S. Cl. 260—246
11 Claims

ABSTRACT OF THE DISCLOSURE

Certain new 3 - amino - 2 - (aminomethyl)propionaphthones are active against bacteria and fungi. The amino groups may be broadly selected from disubstituted amino and saturated heterocyclic amino, and the naphthyl group may be substituted with alkyl, alkoxy, nitro, or halogen. Antifungal activity has been demonstrated against the bean root rot fungi, *Fusarium solani f. phaseoli* and *Rhizoctonia solani*.

SUMMARY OF THE INVENTION

This invention pertains to new organic chemical compounds, a process for preparing the same, new microbiocidal compositions, and a new method for controlling microbes. More particularly, the invention is directed to new 3-amino - 2 - (aminomethyl)propionaphthones, the process of reacting an acetonaphthone with a secondary amine free base and formaldehyde in an aqueous reaction medium, new compositions of 3-amino-2-(aminomethyl) propionaphthones for the control of bacteria and fungi, and a new method for controlling bacteria and fungi.

The novel 3-amino-2-(aminomethyl)propionaphthones of this invention can be represented by the structural formula:

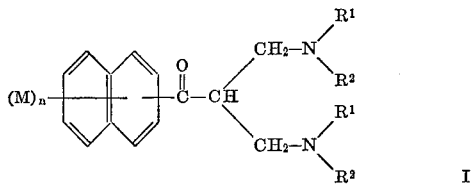

wherein M is alkyl of from 1 to 4 carbon atoms, inclusive, alkoxy of from 1 to 4 carbon atoms, inclusive, nitro, or halogen; $n$ is an integer 0, 1, 2, or 3; and $R^1$ and $R^2$ are more fully described as follows:

Individually, $R^1$ and $R^2$ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and Collectively, the

group is a saturated heterocyclic amino group of from 5 to 7 ring atoms, inclusive, having a total of not more than 15 carbon atoms.

DETAILED DESCRIPTION OF THE INVENTION

The new 3-amino-2-(aminomethyl)propionaphthones of this invention are represented in Formula I, above, in the free base form. Those skilled in the art, however, will note that the amino groups shown will associate with the hydrogen ions of a dissociated acid to form stable acid addition salts. Hence, the stable acid addition salts are contemplated as an embodiment of the invention. The acid addition salts are readily prepared, and are a convenient form of the new compounds for many purposes.

Illustratively, acid addition salts afford a convenient means of obtaining the compounds in pure form. The pure free base compounds can be obtained from an acid addition salt by neutralizing the acid with a base and recovering the free base according to conventional methods. Likewise, the acid addition salts of the invention are a convenient means of obtaining the compounds in crystalline form, and for minimizing decomposition of the free bases.

Acid addition salts are also a convenient form of the compounds of the invention for assuring solubility in aqueous media. This quality of the acid addition salts can be especially important in combatting fungi and bacteria on animals, plants, and soil. All acid addition salts are useful as fungicides and bactericides as long as the acid anion does not interfere with the desired effect of the free base.

The new 3-amino-2-(aminomethyl)propionaphthones form both mono- and diacid addition salts, the hydrochlorides and dihydrochlorides being representative, readily preparable, and preferred. The hydrochlorides are obtained by using hydrochloric acid or anhydrous hydrogen chloride. Other representative mineral acid addition salts are the hydrobromides, the hydroiodides, the sulfates, the phosphates, the hexafluorophosphates, the nitrates, the arsenates, and the fluosilicates. Representative organic acid addition salts are the acetates, the propionates, the benzoates, the salicylates, the glycolates, the succinates, the nicotinates, the tartrates, the maleates, the malates, the oxalates, the pamoates, the methanesulfonates, the dodecylbenzenesulfonates, the arsanilates, and the lactates.

The fluosilicic acid addition salts of the 3-amino-2-(aminomethyl)propionaphthones of this invention are useful as mothproofing agents in accordance with U.S. Pats. 1,915,334 and 2,075,359. The thiocyanic acid addition salts are useful for condensing with formaldehyde in accordance with U.S. Pats. 2,425,320 and 2,606,155 to form amine thiocyanate-formaldehyde condensation products for use as pickling inhibitors.

The new 3-amino-2-(aminomethyl)propionaphthones of Formula I and acid addition salts are active against microorganisms, particularly fungi and bacteria. Hence, the compounds can be used in the novel compositions of this invention to control fungi and bacteria on organic matter such as wood, cellulosic fibers, leather, seeds, fruits, and vegetables; living plants; soil; and on animals such as fish, reptiles, birds, cattle, horses, dogs, cats, and other animals. The invention provides, therefore, a new means of controlling fungi and bacteria in general, as well as specific fungi and bacteria that are pathogenic to seeds, plants, and animals.

In particular, compounds of this invention have been found to be effective against the bean root rot fungi, *Fusarium solani f. phaseoli* and *Rhizoctonia solani*. Illustratively, an effective compound against both fungi is 3 - morpholino-2-(morpholinomethyl)-1'-propionaphthone.

Other fungi against which the compounds of this invention have been found to be active include: *Botrytis cinerea, Fusarium oxysporum, Monolinia fructicola, Pythium debaryanum,* Stemphyllium species, *Verticillium albo-atrum,* Cytospora species, *Blastomyces dermatitidis, Coccidioides immitis, Cryptococcus neoformans, Histoplasma capsulatum, Trychophyton rubrum, Trichophyton violaceum,* and *Trichophyton asteroides.*

The compounds of the invention are also active against bacteria, for example *Erwinia amylovora.* Some of the compounds have moderate herbicidal activity.

The compounds of Formula I constitute a significant number of new chemical compounds. Many more, in fact, than those skilled in the art will readily perceive. Hence, in order to facilitate comprehension of the scope of this invention, certain descriptive terms will be defined and illustrative examples will be specified so that those skilled in the art can more readily recognize the metes and bounds of the invention.

The term "lower-alkoxy" means methoxy, ethoxy, propoxy, isopropoxy, butoxy, isobutoxy, sec-butoxy, and tert-butoxy.

The phrase "alkyl of from 1 to 8 carbon atoms, inclusive," includes for example, methyl, ethyl, propyl, butyl, pentyl, hexyl, heptyl, octyl, and isomeric forms thereof.

The phrase "alkenyl of from 3 to 8 carbon atoms, inclusive," includes for example, allyl, 1-methallyl, 2-methallyl, 2-butenyl (crotyl), 3-butenyl, 1,2-dimethallyl, 2-ethylallyl, 1 - methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like.

The phrase "aralkyl of from 7 to 13 carbon atoms, inclusive," includes for example, benzyl, phenethyl, 1-phenylethyl, 2-phenylpropyl, 4-phenylbutyl, 6-phenylhexyl, 5-phenyl-2-methylpentyl, benzhydryl, 1-naphthylmethyl, 2-(1-naphthyl)ethyl, 2-(2-naphthyl)ethyl, and the like.

The phrase "cycloalkyl of from 3 to 8 carbon atoms, inclusive," includes for example, cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-trimethylcyclobutyl, cyclopentyl, 2,2-dimethylcyclopentyl, cyclohexyl, 3-methylcyclohexyl, 2,2-dimethylcyclohexyl, cycloheptyl, cyclooctyl, and the like.

The phrase "cycloalkenyl of from 4 to 8 carbon atoms, inclusive," includes for example, 2-cyclobutenyl, 3-cyclopentenyl, 3-cyclohexenyl, 2-ethyl-3-cyclohexenyl, and the like.

The phrase "saturated heterocyclic amino group of from 5 to 7 ring atoms, inclusive, having a total of not more than 15 carbon atoms," includes for example, pyrrolidinyl, lower-alkylpyrrolidinyl, for example, 2-methylpyrrolidinyl, 3-butylpyrrolidinyl, 3-tert-butylpyrrolidinyl, and 2-isohexylpyrrolidinyl, polylower-alkylpyrrolidinyl, for example, 2,3-dimethylpyrrolidinyl, 2,2-dimethylpyrrolidinyl, 2,5-diethylpyrrolidinyl, and 2,3,5-trimethylpyrrolidinyl, piperidino, lower-alkylpiperidino, for example, 2-methylpiperidino, 3-methylpiperidino, 4-methylpiperidino, 3-isopropylpiperidino, and 4-tert-butylpiperidino, polylower-alkylpiperidino, for example, 3,4-diethylpiperidino, 2-methyl-5-ethylpiperidino, 3,5-dipentylpiperidino, 2,4,6-trimethylpiperidino, and 2,3,5-triethylpiperidino, hexamethyleneimino, lower - alkylhexamethyleneimino, for example, 2-ethylhexamethyleneimino, 4-tert-butylhexamethyleneimino, and 3-heptylhexamethyleneimino, polylower-alkylhexamethyleneimino, for example, 2,4 - dimethylhexamethyleneimino, 3,3-dimethylhexamethyleneimino, and 2,4,6-tripropylhexamethyleneimino, 4-loweralkylpiperazinyl, for example, 4-methylpiperazinyl and 4-isopropylpiperazinyl, polylower-alkylpiperazinyl, for example, 2,4,5-trimethylpiperazinyl, morpholino, lower-alkylmorpholino, for example, 2-ethylmorpholino and 3-isobutylmorpholino, polylower-alkylmorpholino, for example, 2-ethyl-5-methylmorpholino and 3,3-dimethylmorpholino, thiamorpholino, lower-alkylthiamorpholino, for example, 3-methylthiamorpholino, and polyloweralkylthiamrpholino, for example, 2,3,6-trimethylthiamorpholino and 2,3,5,6-tetramethylthiamorpholino.

The foregoing specified and many other like saturated heterocyclic amino groups are contemplated as being within the scope of this invention. It will be noted that the saturated amino heterocycle can be other than cycloalkyleneimino and there can be a second hetero atom in the ring, i.e., an oxygen atom, a sulfur atom, or a second nitrogen atom as a ring member.

Accordingly, a further definition of the phrase is: Collectively, $R^1$ and $R^2$ taken as a unit with the $-N<$ atom is a saturated heterocyclic amino group of from 5 to 7 ring atoms, inclusive, having a total of not more than 15 carbon atoms, one of the ring atoms being selected from carbon, oxygen, sulfur, or a second nitrogen atom so that $R^1-R^2$ as a unit is alkylene, oxadialkylene, thiadialkylene, or N-alkylazadialkylene, respectively.

The new 3-amino-2-(aminomethyl)propionaphthones of this invention (compounds of Formula I) can be prepared by a Mannich reaction as described in U.S. Pat. No. 3,058,987. According to the method, an acetonaphthone, a secondary amine acid addition salt, and paraformaldehyde are reacted in the presence of acid, e.g., hydrochloric acid, in an inert organic solvent, e.g., ethanol. This reaction produces a 3-aminopropionaphthone acid addition salt (a mono-Mannich base), i.e., one aminomethyl group is introduced on the 2-carbon atom of the acetonaphthone. The second aminomethyl group is introduced by reacting the 3-aminopropionaphthone with a secondary amine and formaldehyde in a basic reaction medium (in the presence of a solvent such as ethanol). According to the method of the patent, the 3-aminopropionaphthone is used in the form of an acid addition salt and a basic reaction medium is assured by employing an excess of amine (but sodium hydroxide is also suggested).

Alternatively, the 3-amino-2-(aminomethyl)propionaphthones of Formula I can be readily prepared in a one-step synthesis, without the necessity of separating the 3-aminopropionaphthone intermediate by reacting the acetonaphthone, the secondary amine, and the formaldehyde in a lower-alkanoic acid reaction medium. Glacial acetic acid is a preferred lower-alkanoic acid, but propionic and butyric acid can be used. The reaction proceeds at temperatures in the range of about 30° to about 160° C., but temperatures in the range of about 80° to about 120° C. are preferred. Two or more molar equivalents of the secondary amine are used. Formaldehyde is used in excess.

The desired 3-amino - 2 - (aminomethyl)propionaphthone product is recovered from the reaction mixture by conventional methods such as by removing the reaction medium and volatile components by evaporation, or by extracting the free base product with suitable organic solvents after neutralizing the acid. Suitable organic solvents for the extraction are ether and chloroform. When the product separates from the reaction mixture as a solid, the mixture can be filtered and the filter cake washed or redissolved and crystallized. The free bases can be conveniently recovered in the form of acid addition salts.

The new 3-amino-2-(aminomethyl)propionaphthones of Formula I can also be prepared by a new process wherein no acid catalyst is employed. According to this new method, the appropriate acetonaphthone is heated with an excess of a secondary amine free base in the presence of aqueous formaldehyde. The desired 3-amino-2-(aminomethyl)propionaphthone is recovered from the reaction mixture by conventional methods.

Advantageously, the reaction mixture is cooled, extracted with an organic solvent, e.g., technical hexane, ether, benzene, toluene, and like solvents; and the desired product is recovered from the extract by evaporating or distilling the solvent, or by crystallization. Alternatively, the reaction mixture can be set aside and the water phase separated from the oily phase containing the desired product. The oily phase is washed, dried, and chilled to effect crystallization of the product.

The following examples are illustrative of the process and products of the present invention, but are not to be construed as limiting.

EXAMPLE 1

*Preparation of 3 - dimethylamino-2-[(dimethylamino)-methyl]-2'-propionaphthone and the dihydrochloride thereof*

A mixture consisting of 60 g. 3-dimethylamino-2'-propionaphthone hydrochloride (prepared by reacting 2'-acetonaphthone with dimethylamine hydrochloride and paraformaldehyde in the presence of ethanol and hydrochloric acid, in accordance with the procedure of U.S. Pat. 3,058,987), 16 ml. of 37% aqueous formaldehyde, 80 ml. of 25% aqueous dimethylamine, and 100 ml. ethanol was heated at 50° C. for 18 hours. The reaction mixture was then concentrated to about one-half its original volume by evaporating the ethanol and water under reduced pressure. The concentrate was then made alkaline with 10 N aqueous sodium hydroxide, and the alkaline concentrate was extracted with three 100-ml. portions of ether. The ether extracts were combined, washed with two 100-ml. portions of water and then with three 20-ml. portions of saturated aqueous sodium chloride. After removing the ether by evaporation, the residue was crystallized from technical hexane to give 3-dimethylamino-2-[(dimethylamino)-methyl] - 2' - propionaphthone having a melting point of 72° to 74° C.

*Analysis.*—Calcd. for $C_{18}H_{24}N_2O$ (percent): C, 76.02; H, 8.51; N, 9.85. Found (percent): C, 76.10; H, 8.76; N, 9.81.

Anhydrous hydrogen chloride gas in excess was passed into an ether solution of the above free base. The precipitated 3 - dimethylamino - 2 - [(dimethylamino)methyl]-2'-propionaphthone dihydrochloride was recovered by filtration and dried.

EXAMPLE 2

*Preparation of 3-morpholino-2-(morpholinomethyl)-2'-propionaphthone*

A mixture consisting of 43.5 g. 3-morpholino-2'-propionaphthone hydrochloride (prepared by reacting 2'-acetonaphthone with morpholine hydrochloride and paramaldehyde in the presence of ethanol and hydrochloric acid, in accordance with the procedure of U.S. Pat. 3,058,987), 9.4 ml. of 37% aqueous formaldehyde, 26.1 ml. morpholine, and 180 ml. ethanol was heated at the reflux temperature for 1 hour. The ethanol and water were removed by evaporation under reduced pressure, and the residue was mixed with 250 ml. water. The aqueous mixture was made alkaline with concentrated ammonium hydroxide, and the alkaline solution was extracted with three 100-ml. portions of ether. The ether extracts were combined, washed with two 100-ml. portions of water, and finally dried over anhydrous sodium sulfate. After removing the ether by evaporation, the residue was crystallized from ethanol to give 3-morpholino-2-(morpholinomethyl)-2'-propionaphthone having a melting point of 81° to 84° C.

*Analysis.*—Calcd. for $C_{22}H_{28}N_2O_3$ (percent): C, 71.71; H, 7.66; N, 7.60. Found (percent): C, 71.75; H, 7.84; N, 7.57.

EXAMPLE 3

*Preparation of 3-morpholino-2-(morpholinomethyl)-1'-propionaphthone*

A mixture consisting of 30 g. 3-morpholino-1'-propionaphthone hydrochloride (prepared by reacting 1'-acetonaphthone with morpholine hydrochloride and paraformaldehyde in the presence of ethanol and hydrochloric acid, in accordance with the procedure of U.S. Patent 3,058,987), 20 g. of 37% aqueous formaldehyde, 28 g. morpholine, and 50 ml. ethanol was heated at the reflux temperature for 6 hours. The ethanol and water were removed by heating on a steam bath under reduced pressure. The residue was made alkaline with 2 N aqueous sodium hydroxide, and the alkaline solution was extracted with two 100-ml. portions of ether. The combined ether extracts were washed with water and dried over anhydrous sodium sulfate. After evaporating the ether, the residual gum was dissolved in a mixture of technical hexane and acetone. After cooling, crystalline 3 - morprolino-2-(morpholino-ethyl)-1'-propionaphthone separated. The crystals were collected on a filter and recrystallized from acetone to give the compound melting at 104° to 106° C.

*Analysis.*—Calcd. for $C_{22}H_{28}N_2O_3$ (percent): C, 71.71; H, 7.66; N, 7.60. Found (percent): C, 71.47; H, 7.64; N, 7.46.

EXAMPLE 4

*Preparation of 3 - dimethylamino-2-[(dimethylamino) methyl]-2'-propionaphthone and the dihydrochloride thereof*

A quantity (26.5 ml., 0.4 mole) anhydrous dimethylamine was added slowly and with stirring to a cooled suspension of 15 gm. (0.09 mole) 2'-acetonaphthone in a 37% aqueous solution of formaldehyde (there being 32.5 g., 0.4 mole formaldehyde present). The reaction mixture was then heated on a steam bath for one hour. After cooling, the mixture was diluted with 100 ml. water and extracted with two 50-ml. portions of ether. The ether extracts were combined, washed with two 150-ml. portions of water, and dried over anhydrous sodium sulfate. After removing the ether by evaporation, the residual gum was dissolved in warm technical hexane. After chilling in a refrigerator, there was obtained 9.8 g. of 3-dimethylamino - 2 - [(dimethylamino)methyl]-2-propionaphthone. An analytical sample melting at 71° to 73° C. was obtained after recrystallization from petroleum ether.

The dihydrochloride was prepared by dissolving 5 g. of the 3-dimethylamino-2-[(dimethylamino)methyl]-2'-propionaphthone (prepared as above) in 20 ml. acetone and acidifying the solution with a slight excess of methanolic hydrogen chloride. A precipitate that formed was collected on a filter and recrystallized from 250 ml. absolute ethanol. The 3-dimethylamino-2-[(dimethylamino) methyl]-2'-propionaphthone dihydrochloride thus obtained had a melting point of 169° to 170° C.

*Analysis.*—Calcd. for $C_{18}H_{24}N_2O \cdot 2HCl$ (percent): C, 60.50; H, 7.34; Cl, 19.84; N, 7.84. Found (percent): C, 60.33; H, 7.26; Cl, 19.55; N, 7.83.

EXAMPLE 5

Following the procedure of Example 4, but substituting diethylamine; dipropylamine, diallylamine; N-methylbenzylamine; N - methylcyclopentylamine; N-methyl-2-cyclohexenylamine; pyrrolidine; 3-tert-butylpyrrolidine; piperidine; 3,5-dipentylpiperidine; hexamethyleneimine; 2-ethylhexamethyleneimine; 2,4-dimethylhexamethyleneimine; 2,4,6-tripropylhexamethyleneimine; 4-methylpiperazine; 2,4,5-trimethylpiperazine; morpholine; thiamorpholine for dimethylamine, there were prepared the corresponding 3-diethylamino-2-[(diethylamino)methyl]-2'-propionaphthone,
3-dipropylamino-2-[(dipropylamino)methyl-2'-propionaphthone,
3-diallyamino-2-[(diallyamino methyl]-2'-propionaphthone,
3-(N-methylbenzylamino)-2-[(N-methylbenzylamino) methyl]-2'-propionaphthone, 3-(N-methylcyclopentylamino)-2-[(N-methylcyclo-
pentylamino)methyl]-2'-propionaphthaone,
3-(N-methyl-2-cyclohexenylamino)-2-[(N-methyl-2-
cyclohexenylamino)methyl]-2'-propionaphthone,
3-pyrrolidino-2-(pyrrolidinomethyl)-2'-propionaphthone,
3-(3-tert-butylpyrrolidino)-2-[(3-tert-butylprrolidino)-
methyl]-2'-propionaphthone,
3-piperidino-2-(piperidinomethyl)-2'-propionaphthone,
3-(3,5-dipentylpiperidino)-2-[3,5-dipentylpiperidino)
methyl]-2'-propionaphthone,
3-hexamethyleneimino-2-(hexamethyleneiminomethyl)-
2'-propionaphthone,
3 - (2-ethylhexamethyleneimino)-2-[(2-ethylhexamethyl-
eneimino)methyl]-2'-propionaphthone,
3-(2,4-dimethylhexamethyleneimino)-2-[(2,4-dimethyl-
hexamethyleneimino)methyl]-2'-propionaphthone,
3 - (2,4,6 - triproplyhexamethyleneimino) - 2 - [(2,4,6-
tripropylhexamethyleneimino)methyl] - 2' - propio-
naphthone,
3-(4-methylpiperazinyl)-2-[(4-methylpiperazinyl)
methyl]-2'-propionaphthone,
3-(2,4,5-trimethylpiperazinyl)-2-[(2,4,5-trimethyl-
piperazinyl)methyl]-2'-propionaphthone,
3-morpholino-2-(morpholinomethyl)-2'-
propionaphone,
3-thiamorpholino-2-(thiamorpholinomethyl)-2'-
propionaphthone, and
3-(3-methylthiamorpholino)-2-[(3-methylthiamorpho-
lino)methyl)-2'-propionaphthone, respectively.

EXAMPLE 6

Following the procedure of Example 4, but substitut-
ing 4' - chloro-1'-acetonaphthone, 8'-nitro-1'-acetonaph-
thone, 4'-fluoro - 1' - acetonaphthone, 4'-methyl-1'-acto-
naphthone, 4' - methoxy-1'-acetonaphthone, 1'-methoxy-
2'-acetonaphthone, 3'-methoxy - 2' - acetonaphthone, 5'-
nitro-1'-acetonaphthone, 6' - methoxy-1'-actonaphthone,
7'-iodo-1'-acetonaphthone, 6' - bromo-2'-acetonaphthone,
3',4'-dimethyl-1'-acetonapthone, 1',4' - dibromo-2'-aceto-
naphthone, 2' - methoxy-6'-methyl-1'-acetonaphthone, 2'-
methyl-4'-methoxy-1'-acetonaphthone, 3',7' - (dimethoxy-
2' - acetonaphthone, 5'-methyl-6'-methoxy-2'-acetonaph-
thone, 5' - bromo-6'-methoxy-2'-acetonaphthone, 1',6',7'-
trimethyl - 2' - acetonaphthone, and 1'-methyl-6',7'-di-
methoxy-2'-acetonaphthone for 2'-acetonaphthone, there
were prepared the corresponding 3-dimethylamino-2-[(dimethylamino)methyl]-4'-
chloro-1'-propionaphthone,
3-dimethylamino-2-[(dimethylamino)methyl-8'-
nitro-1'-propionaphthone,
3-dimethylamino-2- (dimethylamino)methyl]-4'-
fluoro-1'-propionaphthone,
3-dimethylamino-2-[(dimethylamino)methyl]-4'-
methyl-1'-propionaphthone,
3-dimethylamino-2-[(dimethylamino)methyl]-4'-
methoxy-1'-propionaphthone,
3-dimethylamino-2-[(dimethylamino)methyl]-1'-
methoxy-2'-propionaphthone,
3-dimethylamino-2-[(dimethylamino)methyl]-3'-
methoxy-2'-propionaphthone,
3-dimethylamino-2-[(dimethylamino)methyl]-5'-
nitro-1'-propionaphthone,
3-dimethylamino-2-[(dimethylamino)methyl]-6'-
methoxy-1'-propionaphthone,
3-dimethylamino-2-[(dimethylamino)methyl]-7'-
iodo-1'-propionaphthone,
3-dimethylamino-2-[(dimethylamino)methyl]-6'-
bromo-2'-propionaphthone,
3-dimethylamino-2-[(dimethylamino)methyl]-3',
4'-dimethyl-1'-propionaphthone,
3-dimethylamino-2-[(dimethylamino)methyl]-1',
4'-dibromo-2'-propionaphthone,
3-dimethylamino-2-[(dimethylamino)methyl]-2'-
methoxy-6'-methyl-1'-propionaphthone,
3-dimethylamino-2-[(dimethylamino)methyl]-2'-
methyl-4'-methoxy-1'-propionaphthone,
3-dimethylamino-2-[(dimethylamino)methyl]-3',
7'-dimethoxy-2'-propionaphthone,
3-dimethylamino-2-[(dimethylamino)methyl]-5'-
methyl-6'-methoxy-2'-propionaphthone,
3-dimethylamino-2-[(dimethylamino)methyl]-5'-
bromo-6'-methoxy-2'-propionaphthone,
3-dimethylamine-2-[(dimethylamino)methyl]-1',
6',7'-trimethyl-2'-propionaphthone, and
3-dimethylamino-2-[(dimethylamino)methyl]-1'-
methyl-6',7'-dimethoxy-2'-propionapthone, respectively.

The 3-amino-2-(aminomethyl)propionaphthones (free
base compounds of Formula I and acid addition salts
thereof) are formulated as fungicides and bactericides
with solid and liquid carriers with or without adjuvants.
The compounds can be used in pure form, but generally
the interest of economy is best served by the formulations
of the invention. The pure active compounds or the for-
mulations can be applied to bacteria, fungi, objects, or a
situs for preventing fungal and bacterial growths. The
microbiocidal formulations of this invention include dis-
persions in powder and granular carriers, e.g., dusts and
granules; dispersions in liquid carriers, e.g., true solutions,
suspensions and emulsifiable concentrates; smokes and
aerosols; emulsions, e.g., creams and ointments; and
capsules and tablets.

The 3-amino-2-(aminomethyl)propionaphthones can be
readily formulated as dusts by grinding a mixture of the
compound and a purverulent carrier in the presence of
each other. Grinding is conveniently accomplished in a
ball mill, a hammer mill, or by air-blast micronization.
A suitable ultimate particle size is less than 60 microns.
Preferably, 95% of the particles are less than 50 microns,
and about 75% are 5 to 20 microns. Dusts of that degree
of comminution are conveniently free-flowing and can
be applied to animals, inanimate matter, fruit trees, crop
plants, and soil so as to effect thorough distribution and
coverage. Dusts are particularly adapted for effectively
controlling plant fungi over wide areas when applied by
airplane. They are also indicated for application to the
undersides of plant foliage and to the skin of hairy
animals.

Representative suitable pulverulent carriers include the
natural clays such as China, Georgia, Barden, Attapulgus,
kaolin, and bentonite clays; minerals in their natural
forms as they are obtained from the earth such as talc,
pyrophyllite, quartz, diatomaceous earth, fuller's earth,
chalk, rock phosphates and sulfates, calcium carbonates,
sulfur, silica and silicates; chemically modified minerals
such as washed bentonite, precipitated calcium phosphate,
precipitated calcium carbonate, precipitated calcium sili-
cate, synthetic magnesium silicate, and colloidal silica;
and organic flours such as wood, walnut shell, soybean,
cottonseed, and tobacco flours, and free-flowing, hydro-
phobic starches.

Dusts can also be prepared by dissolving the 3-amino-
2-(aminomethyl)propionaphthones in a volatile solvent
such as methylene chloride, mixing the solution with a
pulverulent carrier and evaporating the solvent.

The proportions of pulverulent carrier and 3-amino-2-
(aminomethyl)propionaphthone can vary over a wide
range depending upon the microbes to be controlled and
the conditions of treatment. In general, dust formulations
can contain up to about 90% (on a weight basis) of the
active ingredient. Dusts having as little as 0.001% of the
active ingredient can be used, but a generally preferred
proportion is from about 0.50% to about 20% of active
ingredient.

The dispersible powder formulations of this invention
are prepared by incorporating a surfactant in a dust
composition prepared as described above. When about
0.1% to about 12% of a surfactant is incorporated in
a dust, the dispersible powder thus obtained is particularly
adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs of active ingredient. The resulting formulation has the following percentage composition (parts herein are by weight unless otherwise specified):

|  | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to soil, plant growth media, or turf at the rate of 40 gals. per acre to give a total application of active ingredient of 1 lb. per acre.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as apichlorohydrin and anti-foaming agents such as stearic acid can also be included.

The granular formulations according to this invention are prepared by permeating a granular carrier with a solution of a 3-amino-2-(aminomethyl)propionaphthone and then drying the granules. Suitable granular carriers include vermiculite, pyrophyllite, and attapulgite. Suitable solvents include acetone, methyl ethyl ketone, and methylene chloride. A solution of 3-amino-2-(aminomethyl)propionaphthone is sprayed on a granular carrier while the carrier is being mixed and tumbled. The granules are then dried. The granules can range in size from about 10 to about 60 mesh, preferably about 30 to about 60 mesh.

The compounds of this invention can be applied to fungi, bacteria, objects, or a situs in aqueous sprays without a solid carrier. Since, however, many of the compounds themselves (particularly the free bases) are relatively insoluble in water, such compounds are preferably dissolved in a suitable inert organic solvent carrier. Advantageously, the solvent carrier is immiscible with water so that an emulsion of the solvent carrier in water can be prepared. If, for example, a water-miscible solvent such as ethanol is used the solvent carrier will dissolve in the water and any excess 3-amino-2-(aminomethyl)propionaphthone will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which the compounds are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing fungal and bacterial growths.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrate can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The rates of application to fungi, bacteria, objects, or situs will depend upon the species of microbe to be controlled, the presence or absence of desirable living organisms, temperature conditions of treatment, and the method and efficiency of application. In general, fungicidal activity is obtained when the compounds are applied at concentrations of about 10 to about 6000 p.p.m., preferably at concentrations of about 100 to about 1200 p.p.m.

The compositions containing 3-amino-2-(aminomethyl) naphthone according to the invention, can be applied by conventional methods to fungi, bacteria, objects or any situs where control of fungi and bacteria is desired. For example, an area of soil or plants can be treated by spraying wettable powder suspensions, emulsions, or solutions from boom-type power sprayers or from hand-operated knapsack sprayers. Dusts can be applied by power duster, or by hand-operated dusters. Creams and ointment formulations can be applied to skin or objects for prolonged protection against the microorganisms.

EXAMPLE 7

A dispersible powder concentrate having the following percentage composition:

| | Percent |
|---|---|
| 3-dimethylamino - 2 - [(dimethylamino)methyl]-2'-propionaphthone | 45.8 |
| Polymerized sodium salt of substituted benzoid long-chain sulfonic acid (Daxad 27) | 9.2 |
| Kaolinite | 45.0 | was prepared by mixing 250 gm. 3-dimethylamino-2-[(dimethylamino)methyl]-2'-propionaphthone, 50 gm. of a polymerized sodium salt of substituted benzoid long-chain sulfonic acid (Daxad 27), and 245 gm. of kaolinite. The mixture was milled to a particle size averaging 5 to 30 microns. It was suspended in 10 gals. of water, giving an aqueous spray containing about 6500 parts per million of active ingredient.

EXAMPLE 8

A fine granular formulation having the following percentage composition:

| | Percent |
|---|---|
| 3 - dimethylamino-2-[(dimethylamino)methyl]-2'-propionaphthone | 3.7 |
| Vermiculite | 96.3 | was prepared by spraying a solution of 220 gm. of 3-dimethylamino - 2 - [(dimethylamino)methyl] - 2' - propionaphthone in 1000 ml. of methylene chloride on 5780 gm. of vermiculite (30 to 60 mesh) while the vermiculite was being tumbled and stirred so as to assure even distribution. The methylene chloride was then evaporated, leaving the 3-dimethylamino-2-[(dimethylamino)methyl]-2'-propionaphthone adsorbed on the vermiculite, and the vermiculite was pulverized.

EXAMPLE 9

An emulsifiiable concentrate having the following percentage composition:

| | Percent |
|---|---|
| 3-morpholino - 2 - (morpholinomethyl) - 2' - propionaphthone | 15.0 |
| Technical alkyl naphthalene boiling at 238° to 293° C. (Velsicol AR50) | 19.7 |
| Xylene | 17.4 |
| Isopropanol | 17.4 |
| Ethylene dichloride | 25.4 |
| Blend of alkyl aryl sulfonates and alkylphenoxy polyethoxy ethanols (Triton X-151) | 5.1 | was prepared by mixing 15.0 lbs. of 3-morpholino-2-(morpholinomethyl)-2'-propionaphthone, 19.7 lbs. of Velsicol AR50, 17.4 lbs. of xylene, 17.4 lbs. of isopropanol, 25.4 lbs. of ethylene dichloride, and 5.1 lbs. of Triton X-151.

6.67 lbs. of the concentrate mixed with 10 gals. of water gave a spray emulsion containing 11,000 p.p.m. of 3-morpholino - 2 - (morpholinomethyl) - 2' - propionaphthone.

EXAMPLE 10

An emulsifiable concentrate having the following percentage composition:

| | Percent |
|---|---|
| 3-morpholino - 2 - (morpholinomethyl) - 2' - propionaphthone | 40.0 |
| Technical alkyl naphthalene boiling at 238° to 293° C. (Velsicol AR50) | 13.7 |
| Xylene | 12.3 |
| Isopropanol | 11.3 |
| Ethylene dichloride | 17.7 |
| Blend of alkyl aryl sulfonates and alkylphenoxy polyethoxy ethanols (Triton X-151) | 5.0 | was prepared by mixing 40.0 lbs. of 3-morpholino-2-(morpholinomethyl)-2'-propionaphthone, 13.7 lbs. of Velsicol AR50, 12.3 lbs. of xylene, 11.3 lbs. of isopropanol, 17.7 lbs. of ethylene dichloride, and 5.0 lbs. of Triton X-151.

1.67 lbs. of the concentrate mixed with 10 gals. of water gave a spray emulsion containing 8,000 p.p.m., of 3-morpholino-2-(morpholinomethyl)-2'-propionaphthone.

EXAMPLE 11

A wettable powder concentrate having the following percentage composition:

| | Percent |
|---|---|
| 3 - dimethylamino - 2 - [(dimethylamino)-methyl]-2'-propionaphthone | 50 |
| Kaolinite clay (finely divided) | 40 |
| Sodium salt of condensed mononaphthalene sulfonic acid (Lomar D) | 4 | was prepared by mixing 50 g. of 3-dimethylamino-2-[(dimethylamino)methyl]-2'-propionaphthone, 46 gm. of the kaolinite clay, and 4 gm. of Lomar D. The mixture was milled to an average particle size of 5 to 30 microns.

EXAMPLE 12

A granular formulation having the following percentage composition:

| | Percent |
|---|---|
| 3 - morpholino-2-(morpholinomethyl)-2'-propionaphthone | 1 |
| Pyrophyllite (30/60 mesh) | 99 | was prepared by dissolving 1.0 lb. of 3-morpholino-2-(morpholinomethyl)-2'-propionaphthone in 10.0 l. of ethylene dichloride and spraying the solution on 99.0 lbs. of pyrophyllite. The granules were dried and then packaged for use.

I claim:

1. 3-amino-2-(aminomethyl)propionaphthones of the formula:

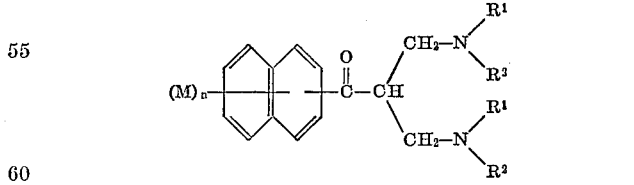

or acid addition salts thereof, wherein M is alkyl of from 1 to 4 carbon atoms, inclusive, alkoxy of from 1 to 4 carbon atoms, inclusive, nitro, or halogen; n is an integer 0, 1, 2, or 3; and R1 and R² are defined as follows:

individually, R¹ or R² are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and collectively, the

group is a saturated heterocyclic amino group of from 5 to 7 ring atoms, inclusive, having a total of not more than 15 carbon atoms and no substituents other than alkyls.

2. 3-amino-2-(aminomethyl) - 2' - propionapthone free base according to claim 1.

3. 3-dialkylamino - 2 - [(dialkylamino)methyl]-2'-propionapthone free base according to claim 2.

4. 3-dimethylamino - 2 - [(dimethylamino)methyl]-2'-propionaphthone free base according to claim 3.

5. 3 - amino - 2 - (aminomethyl)-2'-propionapthone acid addition salt according to claim 1.

6. 3 - dialkylamino - 2 - [(dialkylamino)methyl]-2'-propionaphthone acid according to claim 5.

7. 3-dimethylamino - 2 - [(dimethylamino)methyl]-2'-propionaphthone acid addition salt according to claim 6.

8. 3-dimethylamino - 2 - [(dimethylamino)methyl]-2'-propionaphthone dihydrochloride according to claim 7.

9. 3-morpholino - 2 - (morpholinomethyl)propionaphthone free base according to claim 1.

10. 3-morpholino - 2 - (morpholinomethyl)-2'-propionaphthone free base according to claim 9.

11. 3-morpholino - 2 - (morpholinomethyl)-1'-propionaphthone free base according to claim 9.

References Cited

UNITED STATES PATENTS 3,058,987  10/1962  Albrecht et al. _____ 260—294.7

ALEX MAZEL, Primary Examiner

J. TAVAR, Assistant Examiner

U.S. Cl. X.R.

260—239, 242, 268, 294.7, 326.5, 570.5; 424—244, 246, 248, 250, 267, 274, 330